(12) United States Patent
Tulloch

(10) Patent No.: US 12,071,239 B2
(45) Date of Patent: Aug. 27, 2024

(54) AIRCRAFT WING WITH TRAILING EDGE PANEL

(71) Applicant: Airbus Operations Ltd., Bristol (GB)

(72) Inventor: William Tulloch, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 17/703,733

(22) Filed: Mar. 24, 2022

(65) Prior Publication Data
US 2022/0306274 A1   Sep. 29, 2022

(30) Foreign Application Priority Data

Mar. 26, 2021   (GB) ...................................... 2104326

(51) Int. Cl.
| | | |
|---|---|---|
| *B64C 9/02* | (2006.01) | |
| *B64C 7/00* | (2006.01) | |
| *B64C 9/16* | (2006.01) | |
| *B64F 5/10* | (2017.01) | |

(52) U.S. Cl.
CPC ................. *B64C 9/02* (2013.01); *B64C 7/00* (2013.01); *B64C 9/16* (2013.01); *B64F 5/10* (2017.01)

(58) Field of Classification Search
CPC ..................................... B64C 3/28; B64C 3/26
See application file for complete search history.

(56) References Cited

U.S. PATENT DOCUMENTS

| | | | |
|---|---|---|---|
| 2,169,416 A | 8/1939 | Griswold | |
| 4,007,896 A | 2/1977 | Reynolds | |
| 4,247,066 A | 1/1981 | Frost et al. | |
| 5,735,485 A | 4/1998 | Ciprian et al. | |
| 5,839,698 A | 11/1998 | Moppert | |
| 2007/0114329 A1* | 5/2007 | Lacy | ......................... B64C 9/16 244/34 R |
| 2013/0146712 A1 | 6/2013 | Stewart | |
| 2020/0079491 A1* | 3/2020 | Gruner | ...................... B64C 3/56 |
| 2020/0207459 A1 | 7/2020 | Ehring et al. | |

FOREIGN PATENT DOCUMENTS

| | | |
|---|---|---|
| EP | 0154047 A1 | 9/1985 |
| GB | 445270 A | 4/1936 |

OTHER PUBLICATIONS

British Search Report for Application No. GB2104323 dated Sep. 28, 2021.
British Search Report for Application No. GB2104324 dated Sep. 27, 2021.
British Search Report for Application No. GB2104325 dated Sep. 24, 2021.
British Search Report for Application No. GB2104326 dated Sep. 27, 2021.

* cited by examiner

*Primary Examiner* — Philip J Bonzell
*Assistant Examiner* — Eric Acosta
(74) *Attorney, Agent, or Firm* — KDW Firm PLLC

(57) ABSTRACT

An aircraft wing including a wingbox with an upper cover, a lower cover, and a rear spar. A lower trailing edge panel is provided with a leading edge attached to the wingbox. The wing includes a flap, a flap deployment mechanism which is configured to deploy the flap, and a fairing which covers the flap deployment mechanism. A first end of a link is pivotally attached to the lower trailing edge panel at a first pivot joint, and a second end of the link is pivotally attached to the fairing at a second pivot joint. The second pivot joint is lower than the first pivot joint.

19 Claims, 11 Drawing Sheets

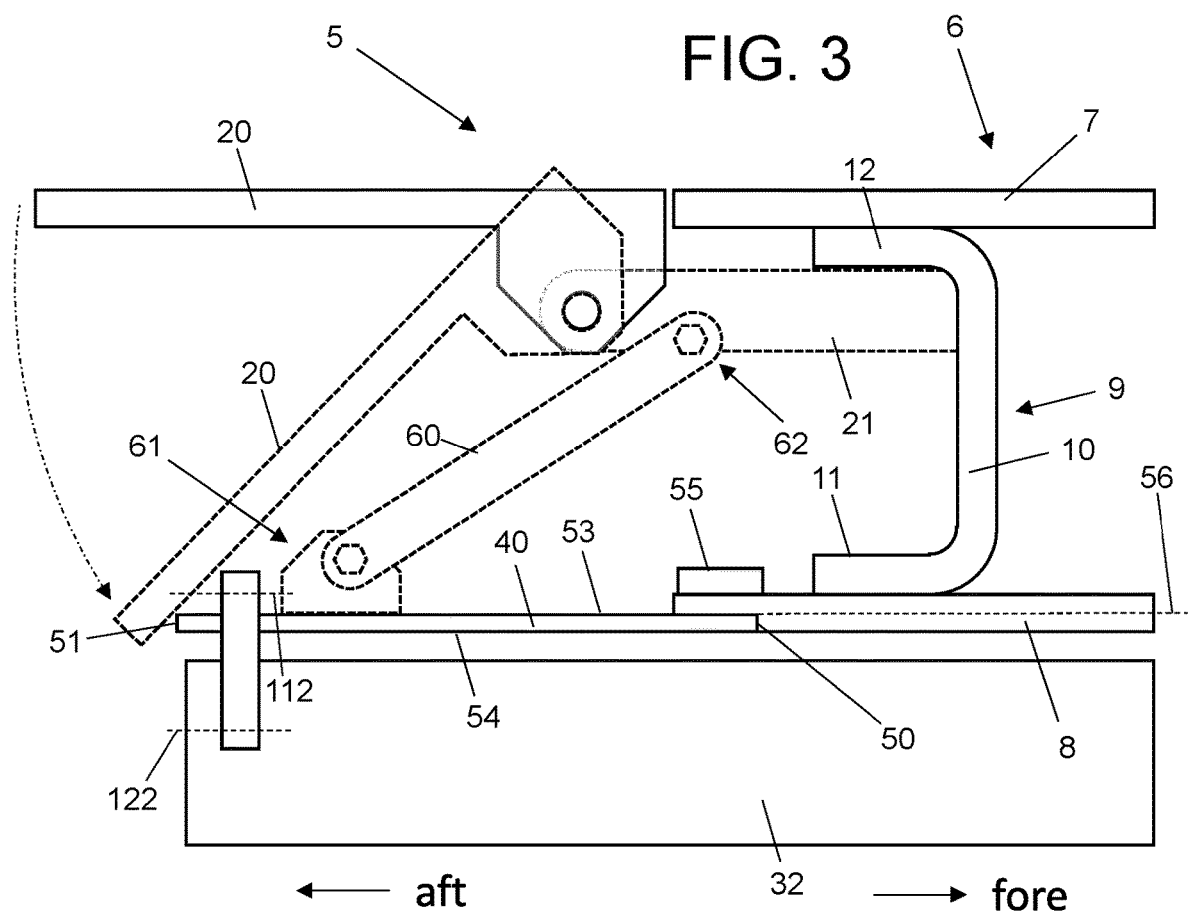
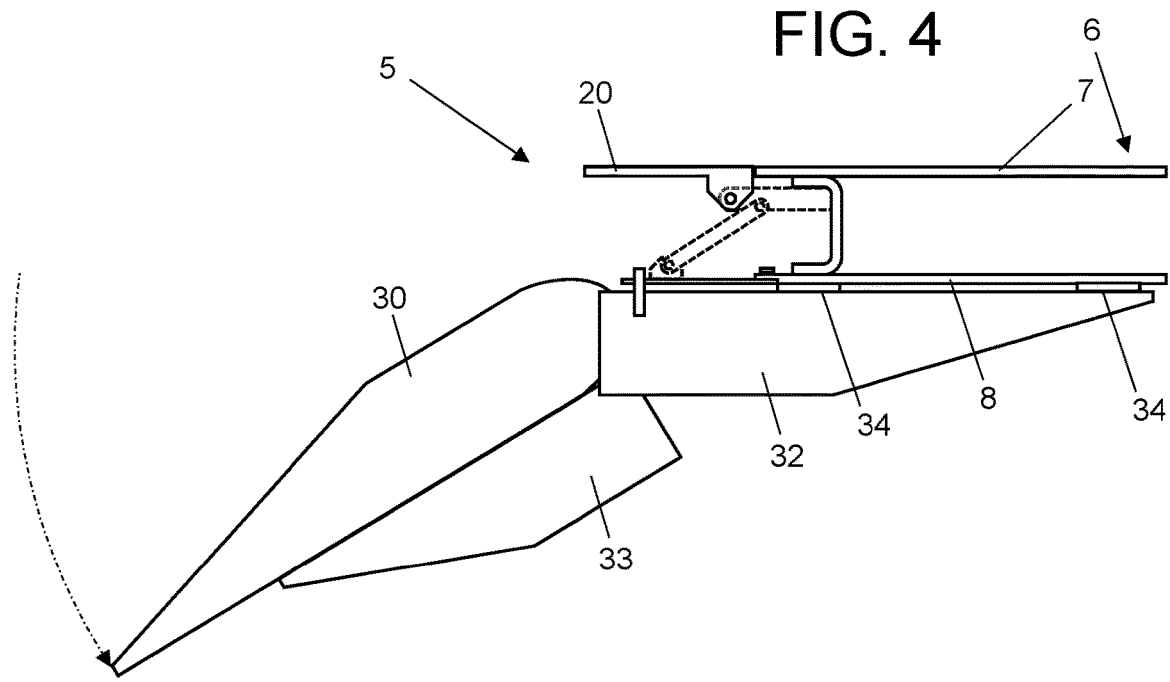

AIRCRAFT WING WITH TRAILING EDGE PANEL

CROSS-REFERENCE TO RELATED APPLICATION

This application claims priority to GB 2104326.0 filed Mar. 26, 2021, the entire disclosure of which is incorporated by reference herein.

TECHNICAL FIELD

The disclosure herein relates to an aircraft wing comprising a wingbox with an upper cover, a lower cover, and a rear spar. A trailing edge panel is attached to the wingbox. In particular, the disclosure herein relates to a support arrangement for supporting the trailing edge panel. The disclosure herein also provides a method of installing or removing routings in an aircraft wing.

BACKGROUND

US2013/0146712 discloses an aircraft wing with an upper shroud panel, and a lower shroud panel. Both shroud panels are attached to, and extend from, respective skin overhangs. In order to attach the upper shroud panel to the upper wing skin overhang, a plurality of pivoting butt straps are provided.

A lower strut joins an attachment lug of the lower shroud panel to a spoiler support rib. The lower strut extends in a fore-aft direction in a vertical chordwise plane. An upper strut is pin joined to the upper shroud panel and to the spoiler support rib. The upper strut extends in a vertical spanwise plane.

SUMMARY

A first aspect of the disclosure herein provides an aircraft wing comprising a wingbox with an upper cover, a lower cover, and a rear spar; a lower trailing edge panel with a leading edge, wherein the leading edge of the lower trailing edge panel is attached to the wingbox; a flap; a flap deployment mechanism which is configured to deploy the flap; a fairing which covers the flap deployment mechanism; and a panel support arrangement which attaches the lower trailing edge panel to the fairing.

Optionally the panel support arrangement comprises a link which extends from a first end to a second end, wherein the first end of the link is pivotally attached to the lower trailing edge panel at a first pivot joint and the second end of the link is pivotally attached to the fairing at a second pivot joint, and the second pivot joint is lower than the first pivot joint.

A further aspect of the disclosure herein provides an aircraft wing comprising a wingbox with an upper cover, a lower cover, and a rear spar; a lower trailing edge panel with a leading edge, wherein the leading edge of the lower trailing edge panel is attached to the wingbox; a flap; a flap deployment mechanism which is configured to deploy the flap; a fairing which covers the flap deployment mechanism; and a link which extends from a first end to a second end, wherein the first end of the link is pivotally attached to the lower trailing edge panel at a first pivot joint, the second end of the link is pivotally attached to the fairing at a second pivot joint, and the second pivot joint is lower than the first pivot joint.

Optionally the lower trailing edge panel defines a plane, the first pivot joint is located above the plane of the lower trailing edge panel, and the second pivot joint is located below the plane of the lower trailing edge panel.

A further aspect of the disclosure herein provides an aircraft wing comprising a wingbox with an upper cover, a lower cover, and a rear spar; a trailing edge panel with a leading edge, wherein the leading edge of the trailing edge panel is attached to the wingbox and the trailing edge panel defines a plane; a support structure; and a link which extends from a first end to a second end, wherein the first end of the link is pivotally attached to the trailing edge panel at a first pivot joint located on a first side of the plane, and the second end of the link is pivotally attached to the support structure at a second pivot joint located on a second side of the plane.

A further aspect of the disclosure herein provides an aircraft wing comprising a wingbox with an upper cover, a lower cover, and a rear spar; a trailing edge panel with a leading edge, a trailing edge, an inboard edge and an outboard edge, wherein the leading edge of the trailing edge panel is attached to the wingbox; a support structure; and a link which extends from a first end to a second end, wherein the first end of the link is pivotally attached to the trailing edge panel at a first pivot joint, the second end of the link is pivotally attached to the support structure at a second pivot joint, and the link crosses above or below the inboard or outboard edge of the trailing edge panel.

Optionally the second pivot joint is horizontally offset from the first pivot joint.

Optionally the leading edge of the lower trailing edge panel extends in a spanwise direction, and the second pivot joint is horizontally offset from the first pivot joint in the spanwise direction.

Optionally the rear spar comprises a spar web, and a center line of the link lies in a plane which is parallel with a plane of the spar web.

Optionally the link has a center line which extends downwardly along its full length from the first end of the link to the second end of the link.

Optionally the center line is substantially straight along its full length from the first end of the link to the second end of the link.

Optionally the link has a center line, and at least part of the center line is offset from a straight line joining the first pivot joint to the second pivot joint.

Optionally the link has a substantially straight center line which is parallel with and offset from a straight line joining the first pivot joint to the second pivot joint.

Optionally the substantially straight center line is parallel with and offset from the straight line joining the first pivot joint to the second pivot joint along its full length from the first end of the link to the second end of the link.

Optionally a straight line joining the first pivot joint to the second pivot joint is angled down by more than 45 degrees relative to the horizontal.

Optionally the wing further comprises a resilient seal member which seals a gap between the fairing and the lower trailing edge panel.

Optionally the lower trailing edge panel has a trailing edge opposite the leading edge, and a pair of opposite spanwise edges; the fairing has an upper edge; and the resilient seal member seals a gap between the upper edge of the fairing and one of the spanwise edges of the lower trailing edge panel.

Optionally the wing further comprises a spoiler; and a spoiler stop protruding from an upper surface of the lower trailing edge panel, wherein the spoiler stop is configured to be contacted by the spoiler in the event of an over-travel failure of the spoiler.

Optionally the first pivot joint is configured to permit rotation about a first pivot axis, and the second pivot joint is configured to permit rotation about a second pivot axis which is preferably substantially parallel with the first pivot axis.

Optionally the forward and rear spar are spaced apart in a fore-aft direction, and the first and second pivot axes extend in the fore-aft direction.

Optionally the lower trailing edge panel has an upper surface, and a lower surface which is configured to be exposed to airflow during flight of the aircraft wing; the fairing has an inner surface which faces towards the flap deployment mechanism, and an outer surface which faces away from the flap deployment mechanism and is configured to be exposed to airflow during flight of the aircraft wing; the first end of the link is pivotally attached to the upper surface of the lower trailing edge panel; and the second end of the link is pivotally attached to the inner surface of the fairing.

Optionally the lower trailing edge panel has a trailing edge opposite the leading edge, and a pair of opposite spanwise edges; and the first end of the link is pivotally attached to the lower trailing edge panel adjacent to one of the spanwise edges of the lower trailing edge panel.

Optionally the aircraft wing further comprises routings which run along the aircraft wing behind the rear spar in a spanwise direction.

Optionally the leading edge of the trailing edge panel is attached to the wingbox by fasteners.

Optionally the plane defined by the lower trailing edge panel is generally horizontal.

Optionally the leading edge of the trailing edge panel is attached to the upper or lower cover. Alternatively, the leading edge of the trailing edge panel may be attached to the rear spar or some other part of the wingbox.

Optionally the upper or lower cover has an overhanging portion behind the rear spar, and the leading edge of the trailing edge panel is attached to the overhanging portion.

A further aspect of the disclosure herein provides a method of assembling or disassembling the aircraft wing, the method comprising installing or removing the routings by moving them transverse to their length past the link or past the panel support arrangement.

BRIEF DESCRIPTION OF THE DRAWINGS

Embodiments of the disclosure herein will now be described with reference to the accompanying drawings, in which:

FIG. 3 shows the spoiler in an over-travel drooped position;

FIG. 4 shows the flap in a high-lift position;

DETAILED DESCRIPTION

Figure 1:
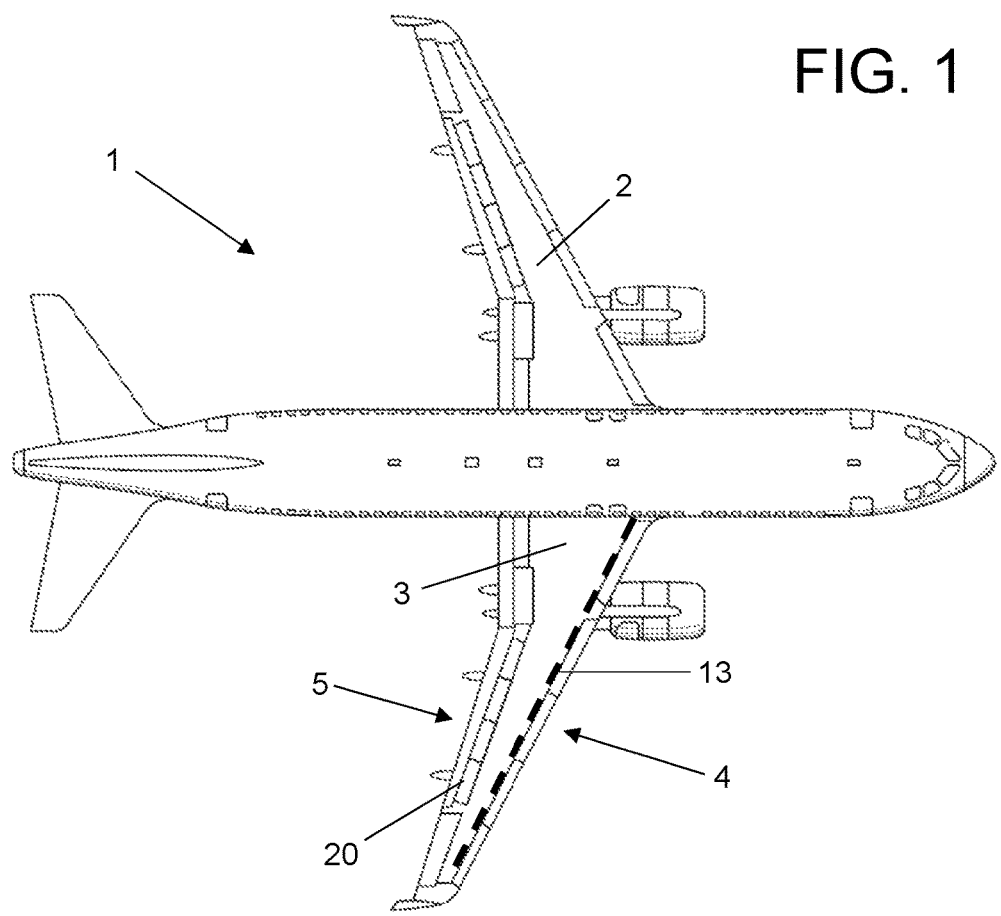
FIG. 1 is a plan view of an aircraft.

An aircraft 1 shown in FIG. 1 has a pair of aircraft wings 2, 3 extending from a fuselage. The wings are identical and only the starboard wing 3 will be described below.

Figure 2:
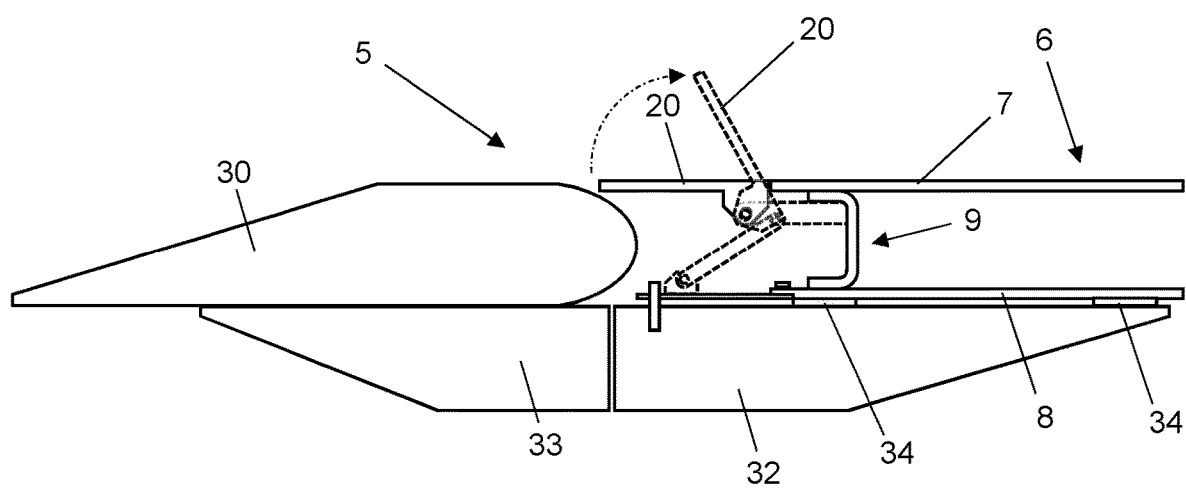
FIG. 2 shows a trailing edge of the starboard wing, viewed from an outboard direction.

The wing 3 has a leading edge 4 and a trailing edge 5. FIG. 2 is a sectional view of the trailing edge 5 viewed from an outboard direction. The wing 3 comprises a wingbox 6 with an upper cover 7, a lower cover 8, a forward spar 13, and a rear spar 9. The forward spar is not shown in FIG. 2, but it is indicated schematically by a dashed line 13 in FIG. 1.

Figure 6:
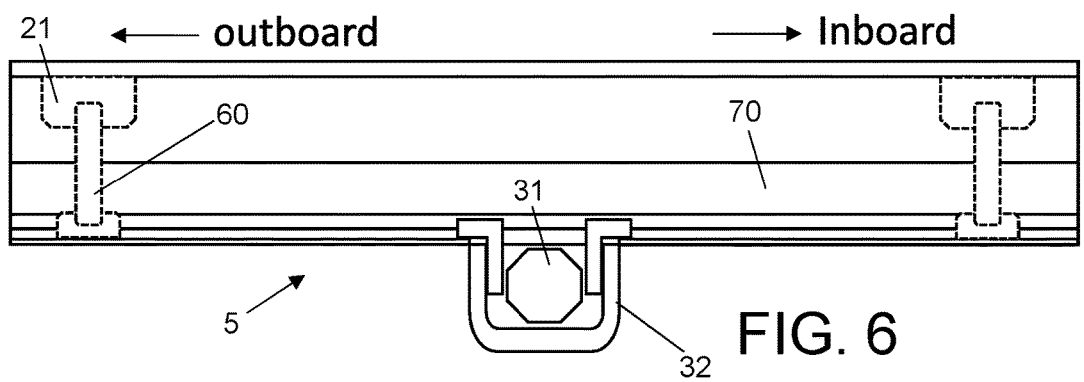
FIG. 6 is a rear view of the part of the trailing edge.

The forward and rear spars 13, 9 are spaced apart in a fore-aft or chordwise direction indicated in FIG. 3, and the spars extend away from the fuselage in a spanwise outboard direction indicated in FIG. 6.

Referring to FIG. 3, the rear spar 9 has a vertical spar web 10, and a pair of flanges 11, 12 which are attached to the upper and lower covers 7, 8 respectively. The covers 7, 8 each have an overhanging portion behind the rear spar 9. The covers 7, 8 are attached to the forward spar 13 in a similar fashion.

The trailing edge 5 carries a set of spoilers, one of which is labeled 20 in FIG. 1 and shown in FIGS. 2-4. As shown in FIG. 3, the spoiler 20 is pivotally mounted on a spoiler support bracket 21 which is attached to the rear spar 9. The spoiler 20 can be moved between a central low drag position shown in solid lines in FIGS. 2 and 3, a raised position showed in dashed lines in FIG. 2, and a drooped position in which the spoiler is rotated down. In the event of failure of the spoiler deployment mechanism, it may rotate down too far, to an over-travel drooped position shown in dashed lines in FIG. 3.

Figure 5:
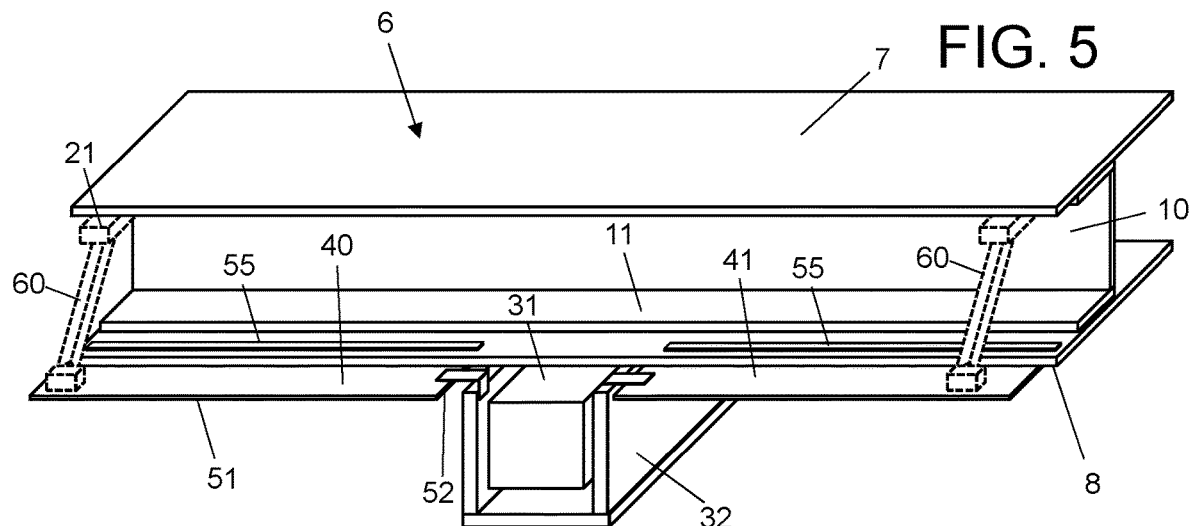
FIG. 5 is an isometric view showing part of the trailing edge.
Figure 7:
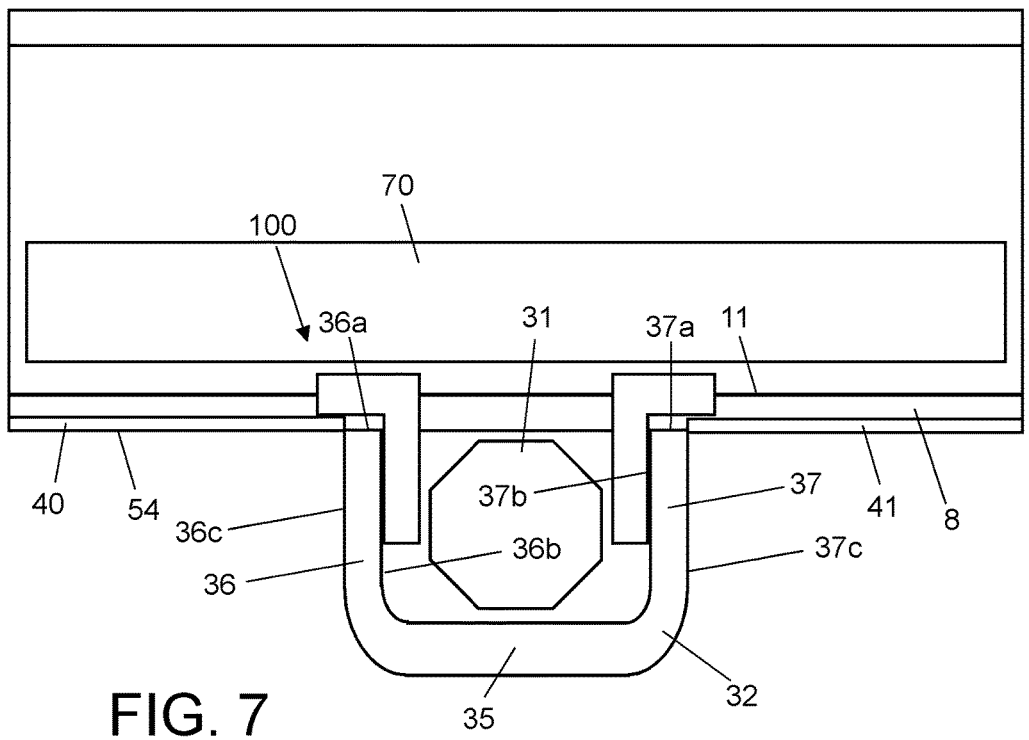
FIG. 7 is an enlarged view showing the flap track fairing.

The trailing edge 5 also carries a pair of flaps, one of which is labeled 30 in FIG. 1 and shown in FIGS. 2 and 4. A deployment mechanism 31 shown in FIGS. 5-7 is configured to deploy the flap 30 between a low drag position shown in FIG. 2, and a high lift position shown in FIG. 4. The deployment mechanism 31 may comprise a flap track which carries the flap 30 and is driven on rollers to deploy the flap 30, or any other kind of deployment mechanism.

A pair of fairings 32, 33 cover the flap deployment mechanism 31. A fixed fairing 32 is attached to the lower cover 8 by tension joints 34 and covers a forward part of the deployment mechanism 31. A movable fairing 33 covers a rear part of the deployment mechanism 31 and moves with the flap 30. These fairings 32, 33 are conventionally known as flap-track fairings.

As shown in FIG. 7, the fixed fairing 32 has a U-shaped profile, with a horizontal base 35 and a pair of vertical side walls 36, 37. Each side wall has an upper edge 36a, 37a which is attached to the lower cover 8 by the tension joints 34; an inner surface 36b, 37b which faces towards the flap deployment mechanism 31; and an outer surface 36c, 37c which faces away from the flap deployment mechanism 31. The outer surfaces 36c, 37c are configured to be exposed to airflow during flight of the aircraft.

The trailing edge 5 also has a set of lower trailing edge panels which fill the gap between the trailing edge of the lower cover 8 and the flap 30. Parts of two of the lower trailing edge panels are shown in FIGS. 5-7: a first lower trailing edge panel 40 on an outboard side of the fairing 32, and a second lower trailing edge panel 41 on an inboard side of the fairing 32. The panels 40, 41 are similar, so only the first panel 40 will be described in detail.

The panel 40 has a leading edge 50 (shown in FIG. 3) which is attached to the wingbox, and a trailing edge 51 opposite the leading edge 50. The leading edge 50 and the trailing edge 51 extend in the spanwise direction, parallel with the rear spar 9.

The leading edge 50 of the panel 40 is attached to the overhanging portion of the lower cover 8 by anchor nut rails 55. Each anchor nut rail 55 carries a line of anchor nuts (not shown) and the leading edge 50 of the panel 40 is attached by passing fasteners through the panel 40, the overhanging portion of the lower cover 8, and the nut rail 55 and then screwing the fasteners into the anchor nuts.

The panel 40 also terminates at each end at a pair of opposite spanwise edges: an inboard edge 52 shown in FIGS. 5-7 at one spanwise end of the panel 40, and an outboard edge (not shown) at an opposite spanwise end of the panel 40.

The panel 40 also has a horizontal upper surface 53 and a horizontal lower surface 54, indicated in FIG. 3. The lower surface 54 is configured to be exposed to airflow during flight of the aircraft. The upper surface 53 defines a generally horizontal plane 56.

The panel 40 is attached to the spoiler support bracket 21 by one or more mid-span support links 60. One of such mid-span support links 60 is shown in FIG. 3. The mid-span support link 60 extends from a first end to a second end. The first end of the mid-span support link 60 is pivotally attached to the lower trailing edge panel 40 at a first pivot joint 61, and the second end of the mid-span support link 60 is pivotally attached to the spoiler support bracket 21 at a second pivot joint 62. The second pivot joint 62 is higher than the first pivot joint 61.

As shown in FIG. 3, the mid-span support link 60 extends in a fore-aft direction in a vertical chordwise plane.

Figure 8:
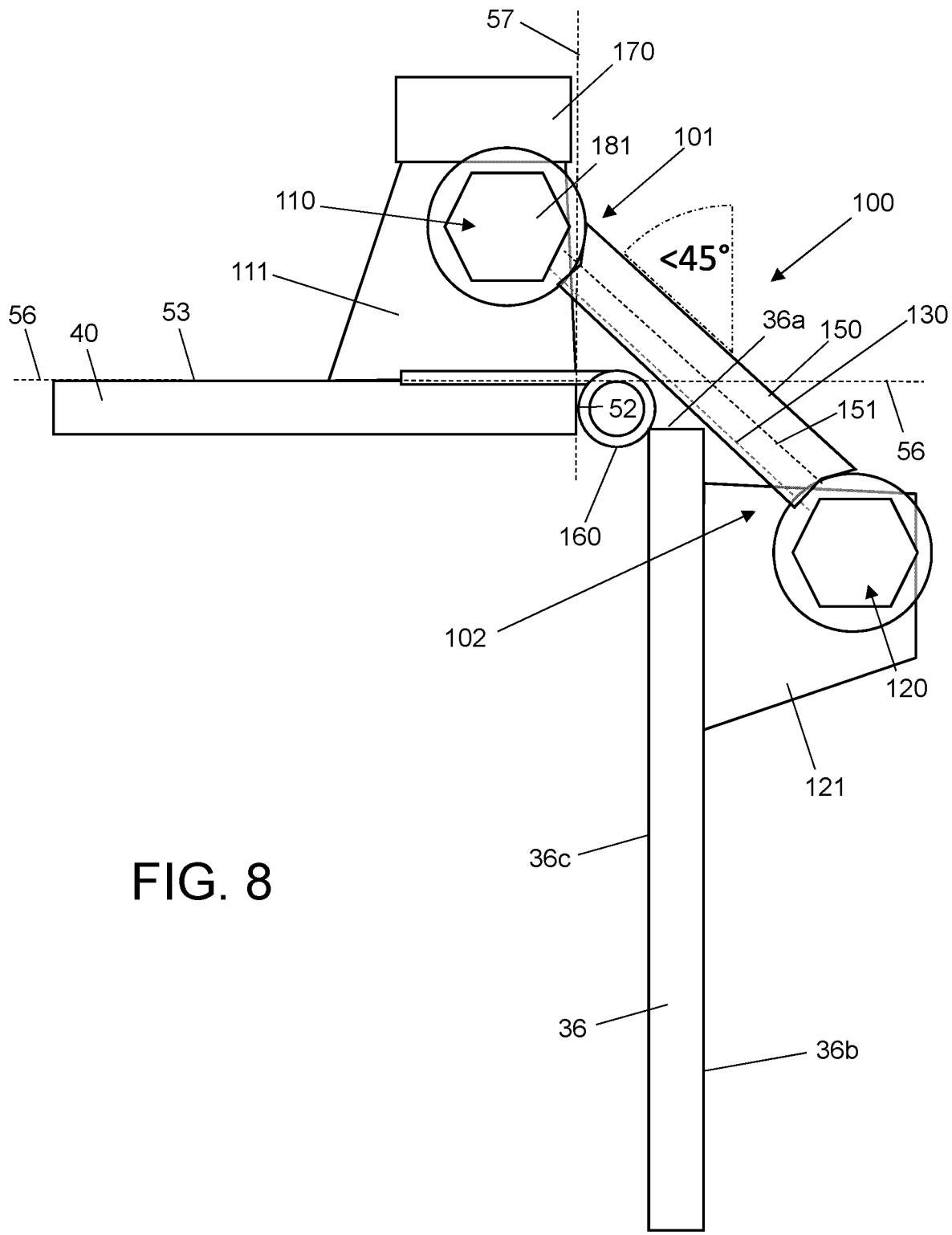
FIG. 8 shows a panel support arrangement according to a first embodiment of the disclosure herein.

A resilient elastomeric seal member 160, shown in FIG. 8, seals a gap between the upper edge 36a of the side wall 36 of the fairing 32, and the inboard edge 52 of the lower trailing edge panel 40. The seal member 160 can flex to enable the panel 40 to deflect in the spanwise direction, while continuing to seal the gap.

Optionally one or more of the panels 40, 41 are removable, enabling access to the trailing edge 5 for inspection or repair. The panels 40, 41 may be made from a cheaper, thinner and lighter material than the lower cover 8. It is therefore important that the panels 40, 41 do not pick up bending loads as the wing bends during flight. For this reason the support arrangements for the panels 40, 41 (i.e. the mid-span support links 60, the anchor nut rails 55, etc.) may allow the panels 40, 41 to deflect relative to the wingbox 6, particularly in a spanwise direction.

Minimizing space within the trailing edge 5 maximizes fuel tank volume and minimizes the height of the aerofoil section, which maximizes performance. The space available within the trailing edge 5 may therefore be very limited, and so it is important that the support arrangements for the panels 40, 41 take up as little of this space as possible.

The trailing edge 5 also houses various mechanical and electrical systems routings 70 shown in FIGS. 6 and 7 which run along the wing behind the rear spar 9 in a spanwise direction. The support arrangements for the panels 40, 41 must not clash with these routings 70, or any other obstructions.

It is preferable that the support arrangements for the panels 40, 41 enable the routings 70 to be installed or removed as a modular unit by moving them in the fore-aft direction (transverse to their length) rather than by threading the routings 70 along the wing in the spanwise direction (along their length).

Thus, the routings 70 may be installed by moving them in the forward direction into the rear spar, then fitting the mid-span support links 60. This process may be reversed to remove the routings 70: removing the mid-span support links 60 and then removing the routings 70 from the rear spar in the aft direction.

The support arrangements for the panels 40, 41 must also be low profile, in order to maintain kinematic function of all movables (flaps, spoilers, ailerons etc.).

Another important design constraint for the panels 40, 41, and their support arrangements, is that they can withstand an over-travel failure of the spoiler 20, in which the spoiler 20 rotates down to the over-travel drooped position shown in dashed lines in FIG. 3. Note that in FIG. 3 the spoiler has contacted the trailing edge 51 of the panel 40, which may cause damage to the spoiler 20 and/or to the panel 40.

The trailing edge 5 may also have upper trailing edge panels, located at parts of the wing where there are no spoilers. Such upper trailing edge panels share some of the design constraints of the lower trailing edge panels 40, 41, in particular the requirements that the support arrangements for the upper trailing edge panels take up only a small amount of space, and do not clash with the routings 70, or any other obstructions.

As explained above, a mid-span region of the lower trailing edge panel 40 is supported by one or more mid-span support links 60. In order to avoid flutter caused by the complex airflows at each spanwise end of the panel 40, it is also desirable to provide support for the inboard and outboard edges of the panel 40. To this end, the inboard edge 52 of the lower trailing edge panel 40 is attached to the side wall 36 of the fairing 32 by a panel support arrangement 100 which is illustrated schematically in FIGS. 2-7, and in detail in FIG. 8. The outboard edge of the lower trailing edge panel 41 is attached to the fairing 32 by a similar panel support arrangement which is also illustrated schematically in FIGS. 2-7.

The panel support arrangement 100 shown in FIG. 8 comprises a link 150 which extends from a first end 101 to a second end 102. The link 150 may be made from aluminum, or any other suitable material.

The first end 101 of the link is pivotally attached to the upper surface 53 of the lower trailing edge panel at a first pivot joint 110 adjacent to the inboard edge 52 of the lower trailing edge panel. The second end 102 of the link is pivotally attached to the inner surface 36b of the side wall 36 of the fairing 32 at a second pivot joint 120 adjacent to the upper edge 36a of the side wall 36 of the fairing 32.

As shown in FIG. 8, the upper surface 53 of the lower trailing edge panel 40 is substantially perpendicular to the inner surface 36b of the side wall 36 of the fairing 32.

The first pivot joint 110 comprises a first bracket 111 which protrudes from the upper surface 53 of the lower trailing edge panel adjacent to its inboard edge 52. The second pivot joint 120 comprises a second bracket 121 which protrudes from the inner surface 36b of the side wall 36 of the fairing 32 adjacent to the upper edge 36a of the side wall 36.

The first pivot joint 110 is located above the plane 56 of the panel, and the second pivot joint 120 is located below the plane 56 of the panel. The link 150 is a straight arm which extends downwardly at all points from the first end 101 of the link to the second end 102 of the link.

In its secured state shown in FIG. 8, the link 150 also crosses above the inboard edge 52 of the trailing edge panel 40. In other words, the link 150 intersects with a vertical line 57 extending from the inboard edge 52.

The first pivot joint 110 is a pin joint which is configured to only permit rotation about a first pivot axis 112, indicated in FIG. 3, which extends in the fore-aft (or chordwise) direction. The second pivot joint 120 is similar—i.e. it is a pin joint which is configured to only permit rotation about a second pivot axis 122, also indicated in FIG. 3, which also extends in the fore-aft or chordwise direction. The second pivot axis 122 is preferably substantially parallel with the first pivot axis 112.

The axis 122 of the second pivot joint 120 is vertically offset below the axis 112 of the first pivot joint 110 by a distance V. The axis 122 of the second pivot joint 120 is also horizontally offset from the axis 112 of the first pivot joint 110 in the spanwise direction by a distance H.

The horizontal offset H may be less than the vertical offset V, so that a straight line 130 joining the first pivot joint 110 to the second pivot joint 120 is angled down by more than 45 degrees relative to the horizontal.

The link 150 has an arm with a center line 151 which extends downwardly along its full length from the first end 101 of the link to the second end 102 of the link. The center line 151 is substantially straight along its full length from the first end 101 of the link to the second end 102 of the link.

The center line 151 is parallel with and offset from the straight line 130 joining the first pivot joint 110 to the second pivot joint 120. Offsetting the center line 151 in this way enables the link 150 to avoid clashing with the upper edge 36a of the side wall 36 of the fairing 32.

The first bracket 111 protruding from the upper surface of the lower trailing edge panel provides a spoiler stop configured to be contacted by the spoiler 20 in the event of an over-travel failure of the spoiler. The top of the first bracket 111 carries a polytetrafluoroethylene (PTFE) stopper 170 to avoid damage from (or to) the spoiler 20.

Figure 9:
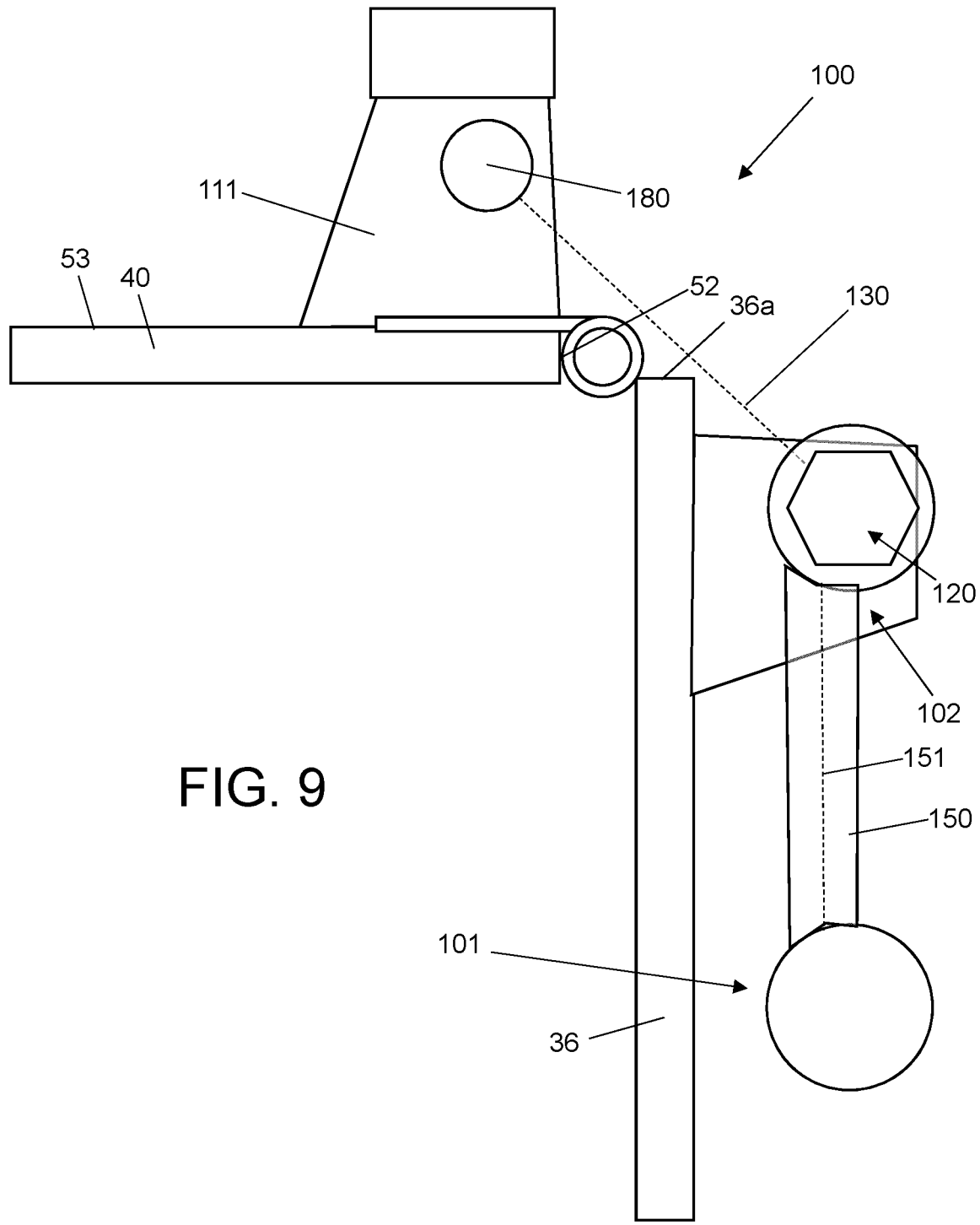
FIG. 9 shows the link of FIG. 8 hanging down before it is secured to the lower trailing edge panel.

The panel support arrangement 100 of FIG. 8 can be assembled as follows. First, the trailing edge panel 40 and the fairing 32 are installed with the link 150 hanging down below the second pivot joint 120 as shown in FIG. 9. The link 150 is then manually rotated up on the second pivot joint 120 to bring the first end 101 of the link into alignment with a hole 180 in the first bracket 111. The first pivot joint 110 is then assembled by installing a bolt or pin 181 through the hole 180 in the first bracket 111.

The assembly method of FIG. 9 relies on a lack of obstructions inside the fairing 32 which would prevent the link 150 from being rotated up.

Figure 10:
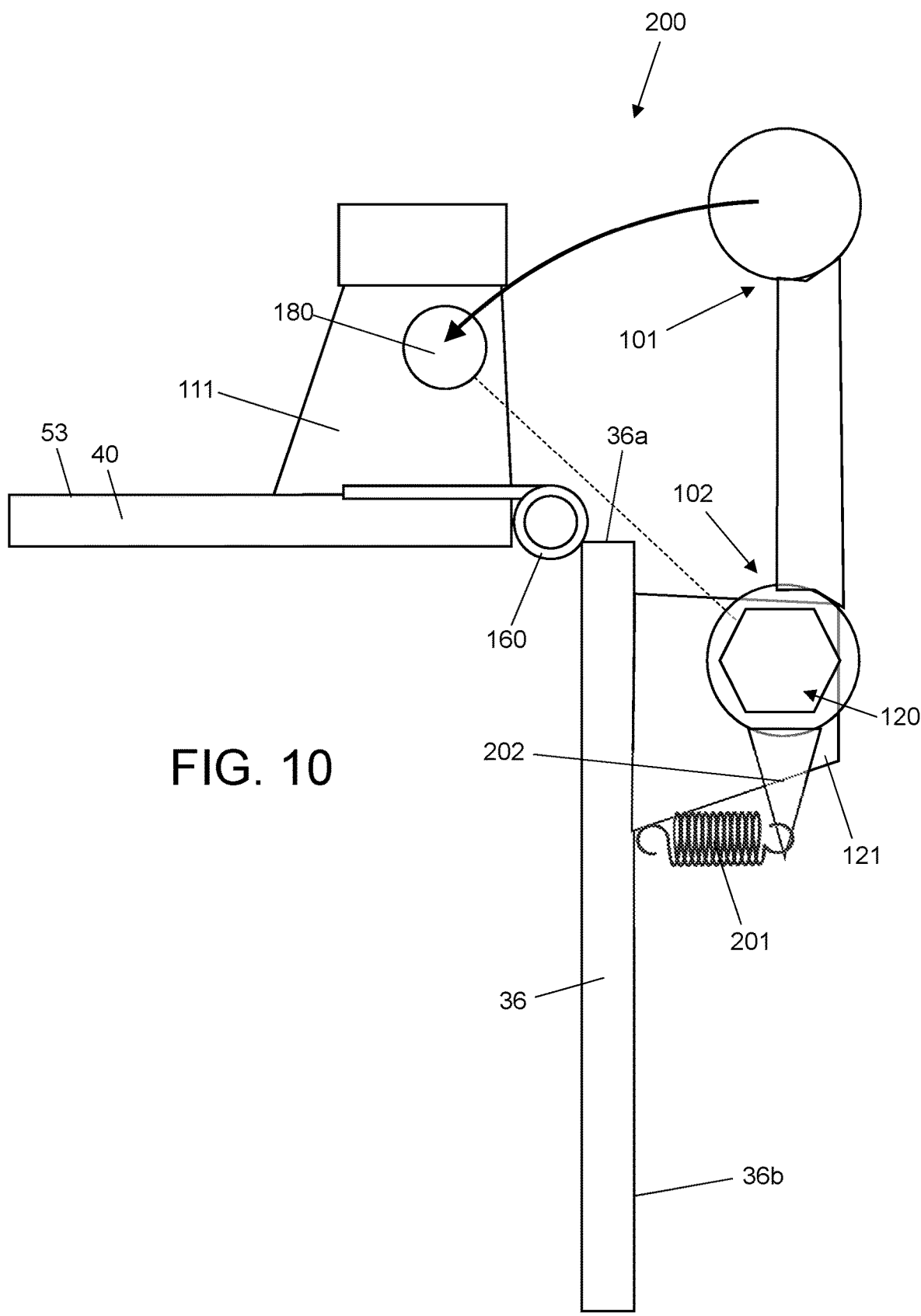
FIG. 10 shows a panel support arrangement according to a second embodiment of the disclosure herein, showing the link in an upright orientation before it is secured to the lower trailing edge panel.
Figure 11:
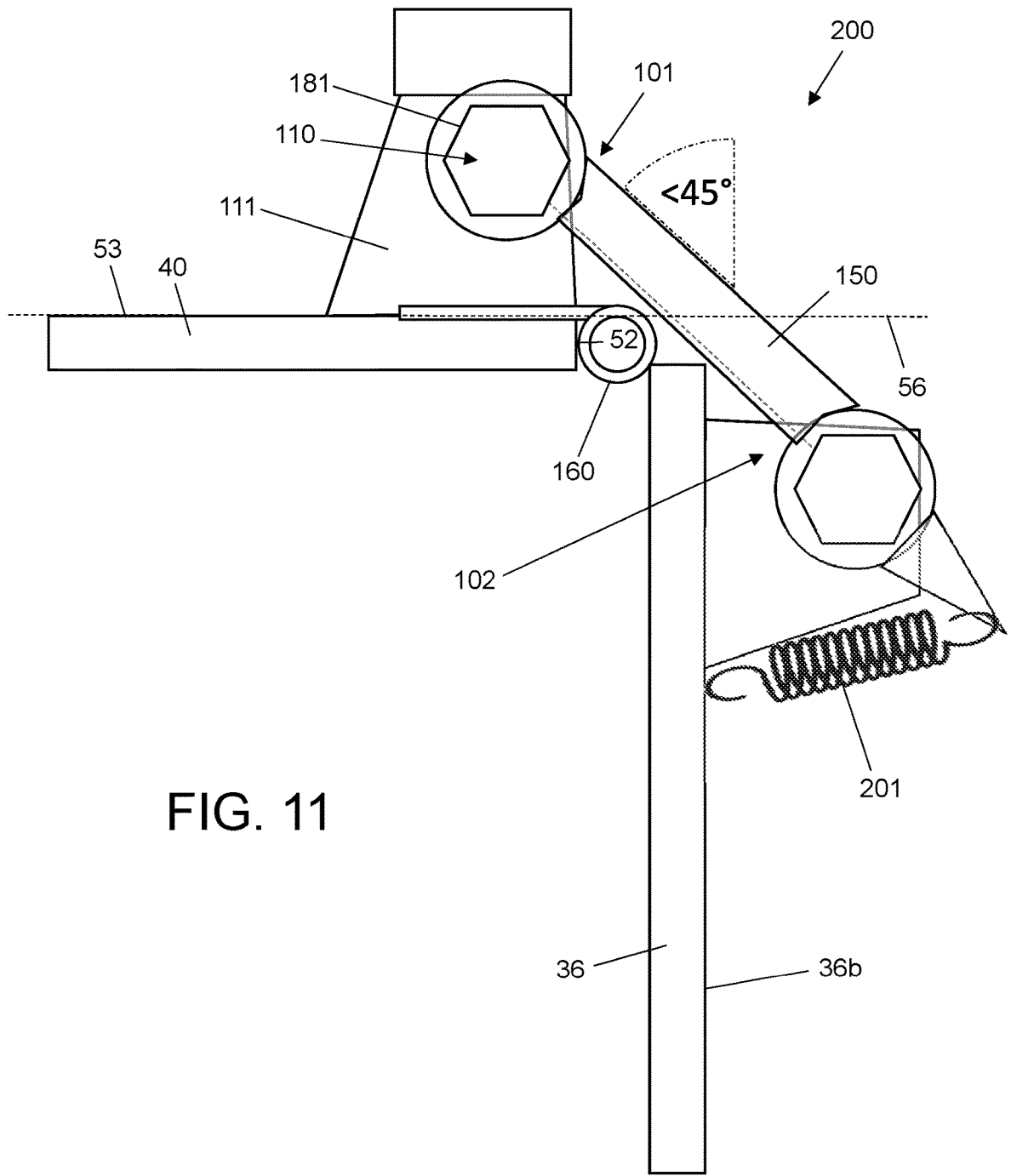
FIG. 11 shows the panel support arrangement of FIG. 10 after the link has been secured to the lower trailing edge panel.

FIGS. 10 and 11 show a panel support arrangement 200 according to a second embodiment of the disclosure herein, which can be used if there is an obstruction inside the fairing 32 (such as the deployment mechanism 31) which would prevent the link 150 from being rotated up.

Most elements of the panel support arrangement 200 are identical to the panel support arrangement 100 of FIGS. 8 and 9, so only the differences will be described.

A biasing arrangement is provided in the form of a spring 201 coupled to the link 150 by a downward grow-out 202.

The spring 201 biases the link 150 towards an upright orientation in which the first end 101 of the link 150 is directly above the second pivot joint 120 as shown in FIG. 10. During assembly of the trailing edge 5, the link 150 is held in its upright orientation by the spring 201.

Optionally a light damper may also be provided to retain the link in the upright position of FIG. 10.

The panel 40 is then secured by manually forcing the first end 101 of the link 150 down on the second pivot joint 120 to bring the first end 101 of the link down and into alignment with the hole 180 in the first bracket 111. The first pivot joint 110 is then assembled as shown in FIG. 11 by installing a bolt or pin 181 through the hole 180 in the first bracket 111. Thus the link 150 is not in its upright orientation when the first end 101 of the link is attached to the first bracket 111.

In its secured state shown in FIG. 11, the link 150 extends downwardly from the first end 101 of the link to the second end 102 of the link.

In its secured state shown in FIG. 11, the link 150 also crosses above the inboard edge 52 of the trailing edge panel 40.

In FIG. 10, the spring 201 is in a low energy state—i.e. it is not compressed or extended. The link 150 has a tendency to fall down under the force of gravity to bring its center of gravity directly under the second pivot joint 120. The spring 201 applies a biasing force which opposes this tendency of the link 150 to fall down. So, the spring 201 holds the link 150 in its upright orientation by applying the biasing force to the link.

As the link 150 is pushed down and away from its upright orientation to the orientation of FIG. 11, the spring 201 becomes extended and the biasing force opposes the rotation of the link 150.

Therefore, in the final secured state of FIG. 11, the spring 201 is in an energized (extended) state—in other words, the link 150 is spring-loaded. If the first end 101 of the link 150 is detached from the first bracket 111, then the biasing force will rotate the link 150 about the second pivot joint 120 towards the upright orientation of FIG. 10, and the first end 101 of the link 150 will move up and away from the first bracket 111.

The stiffness of the spring 201 is tuned by design to be: a) stiff enough to hold the link 150 in its upright position and not vibrate or oscillate into contact with structure during transport prior to connection; and b) flexible enough to allow the link 150 to be forced down relatively easily, and to enable the link 150 to deflect during flight to avoid wing bending loads being fed into the panel 40.

The first end 101 of the link 150 is directly vertically above the second pivot joint 120, when the link it is in its upright position shown in FIG. 10, which is a position of equilibrium. In an alternative embodiment, the first end 101 of the link 150 may not be directly vertically above the second pivot joint 120 when the link is at its position of equilibrium.

FIGS. 12-15 show a panel support arrangement 300 according to a third embodiment of the disclosure herein, which can be used if there is an obstruction inside the fairing 32 (such as the deployment mechanism 31) which prevents the link from being rotated up, and also an obstruction above the panel 40 (such as the mechanical and electrical systems routings 70) which prevents the first end 101 of the link being accessible from above to push it down. The panel support arrangement 300 can be installed without any rotation of the link.

Many elements of the panel support arrangement 300 are identical to the panel support arrangement 200, so only the differences will be described.

A pair of linear bearings 301 are mounted to the upper surface 53 of the lower trailing edge panel 40. The linear bearings 301 protrude from the upper surface 53 of the lower trailing edge panel and provide spoiler stops configured to be contacted by the spoiler 20 in the event of an over-travel failure of the spoiler. The top of each linear bearing 301 carries a PTFE stopper 370 to avoid damage from (or to) the spoiler 20.

A connector beam 302 is movably mounted to the trailing edge panel on the bearings 301. The first end 101 of a link 350 is pivotally attached to a distal end of the connector beam 302 to form the first pivot joint 110.

Figure 12:
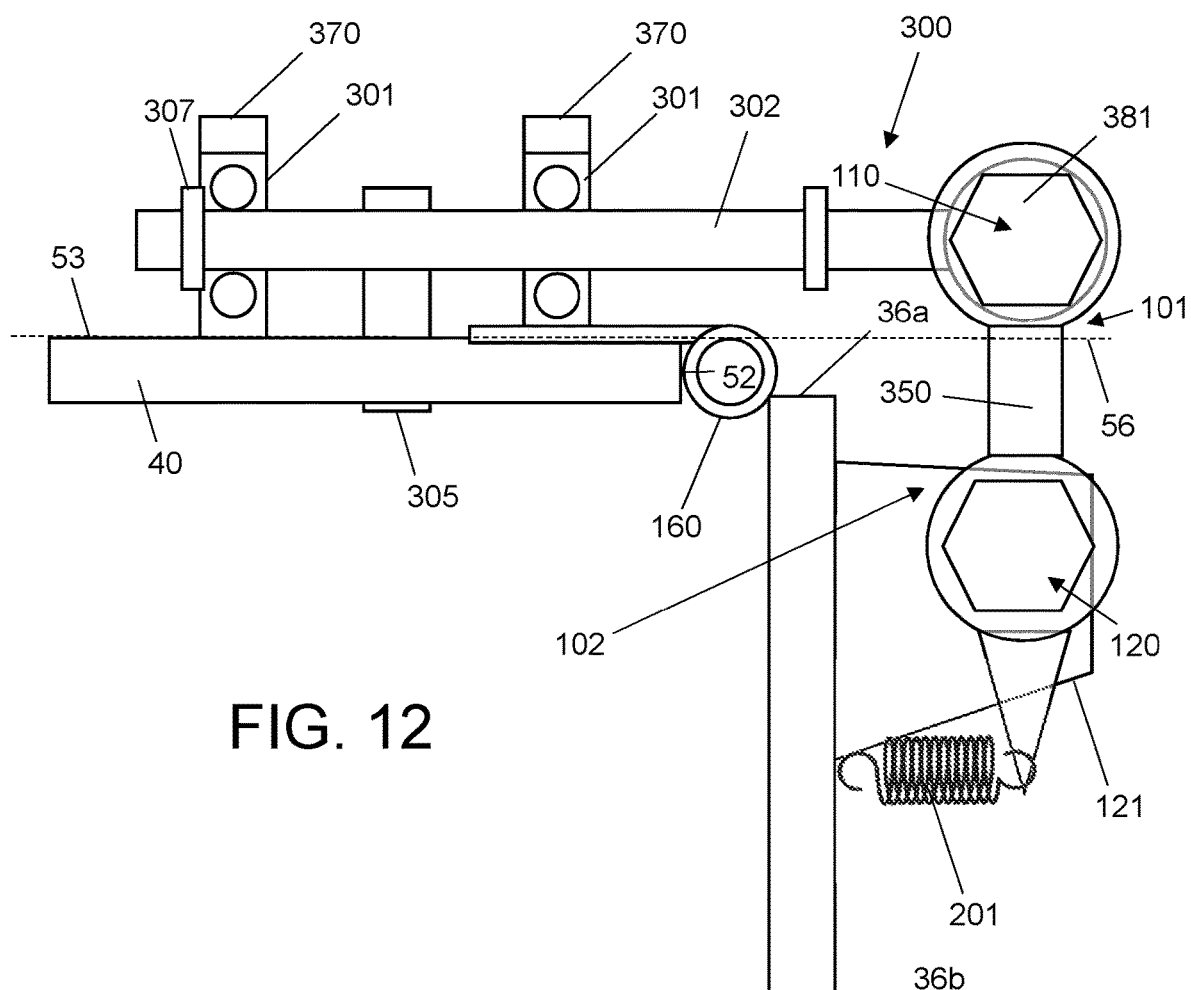
FIG. 12 shows a panel support arrangement according to a third embodiment of the disclosure herein.
Figure 13:
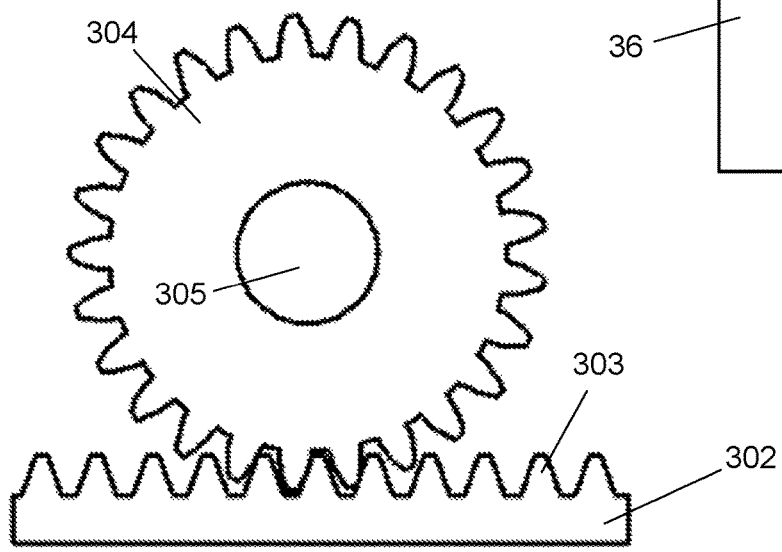
FIG. 13 shows the rack-and-pinion mechanism.

The connector beam 302 comprises a rack 303 shown in FIG. 13. A pinion gear 304 on a shaft 305 is coupled to the rack 303. As shown in FIG. 12, the shaft 305 extends through the panel 40 so it can be engaged from below by a rotary tool.

In the final secured state of the panel support arrangement 200 of FIG. 11, the spring 201 is in an energized (extended) state. This is not the case for the panel support arrangement 300 of FIG. 12. In this case, in the final secured state of FIG. 12 the link 350 is in its upright orientation with the first end 101 of the link directly above the second pivot joint 120. So the spring 201 is in a low energy state whereby if the first end 101 of the link is detached from the connector beam 302, the link 350 will not move and the spring 201 will hold the link 350 in its upright orientation.

Figure 14:
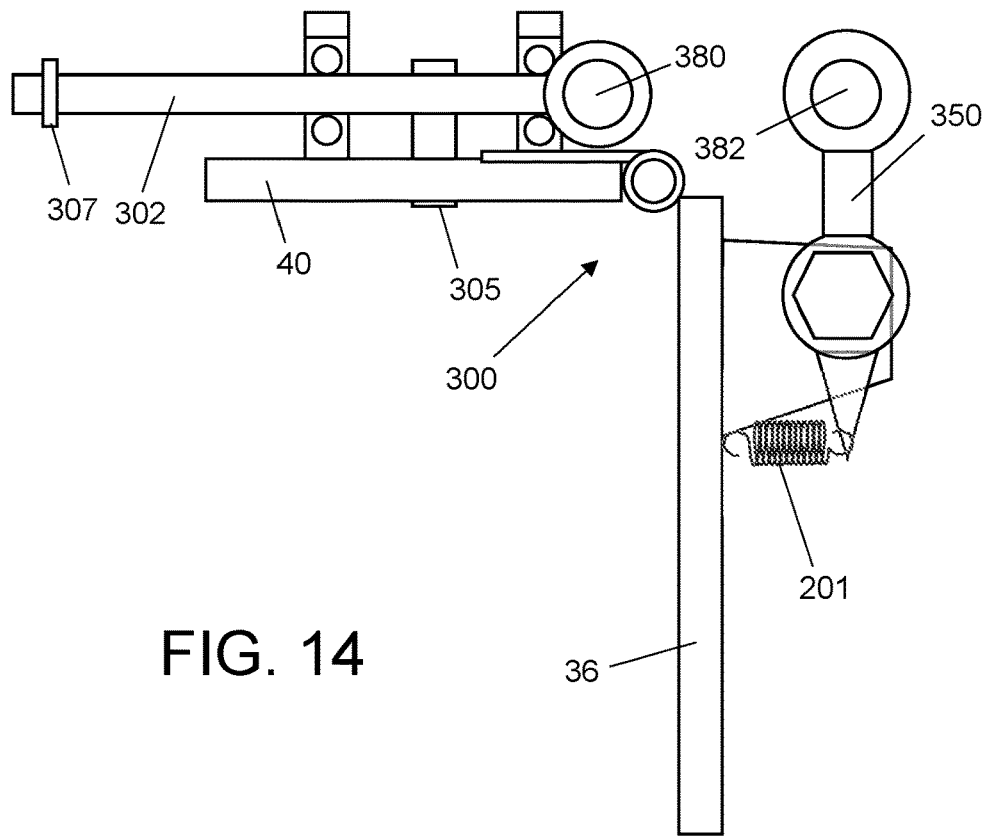
FIG. 14 shows the connector beam in a retracted position.

In an initial assembly stage shown in FIG. 14, the connector beam 302 is in a first (retracted) position. This enables the panel 40 to be lifted up into position without the connector beam 302 clashing with the side wall 36 of the fairing. The spring 201 holds the link 350 in the upright orientation shown in FIG. 14 as the panel 40 is lifted up.

Providing the connector beam 302 in a retracted position during installation of the panel 40 is particularly important when there is an identical panel support arrangement 300 at the opposite (outboard) end of the panel 40. If the connector beams 302 were protruding beyond the spanwise ends of the panel 40, then they would clash with other structure so it would not be possible to lift the panel 40 up into position.

Next, the leading edge of the trailing edge panel 40 is attached to the wingbox. Then a rotary tool 306 under the panel 40 is operated to rotate the pinion gear 304 and drive the connector beam 302 so that it slides on the bearings 301 from the first position of FIG. 14 to a second (extended) position shown in FIG. 15 where it protrudes beyond the inboard edge 52 of the panel. This arrangement enables the connector beam 302 to be driven from below the panel 40 without requiring access from the highly congested trailing edge space above the panel 40.

In the second (extended) position, the distal end of the connector beam 302 is aligned with the first end 101 of the link. The distal end of the connector beam 302 and the first end 101 of the link are located relative to each other either by visual inspection, or controlled by a stop 307 which limits the maximum extent of the connector beam's travel by engaging one of the bearings 301 as shown in FIG. 15.

Figure 15:
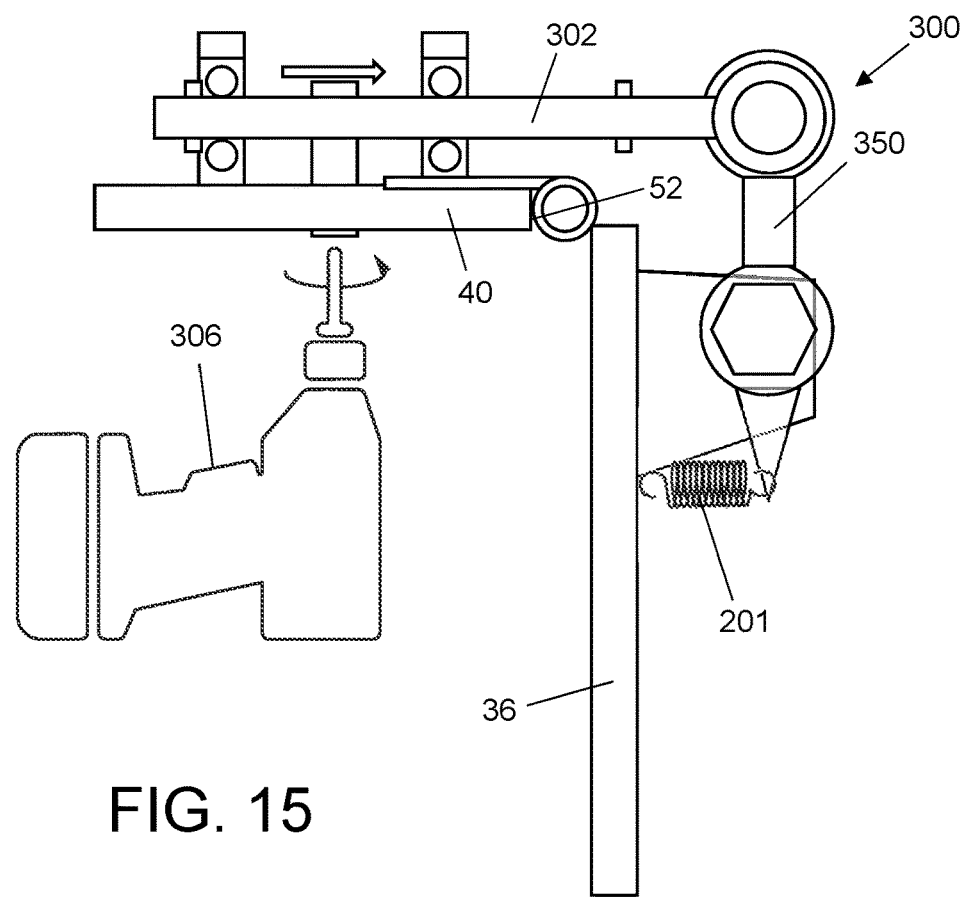
FIG. 15 shows the connector beam being driven to an extended position.

Finally, the connector beam 302 at the second (extended) position of FIG. 15 is attached to the first end 101 of the link to form the first pivot joint 110 shown in FIG. 12 by installing a bolt or pin 381 through a hole 380 at the distal end of the connector beam 302, and a hole 382 at the first end 101 of the link. The link 350 is in its upright orientation when the first end 101 of the link is attached to the connector beam 302.

In the panel support arrangement 300 of FIGS. 13-15, the stiffness of the spring 201 is tuned by design to be: a) stiff enough to hold the link 350 in position and not vibrate or oscillate into contact with structure during transport prior to connection; and b) flexible enough to enable the link 350 to deflect during flight to avoid wing bending loads being fed into the panel 40.

In this embodiment, the connector beam 302 is mounted on linear bearings 301 so it slides on the bearings 301 from the first (retracted) position of FIG. 14 to the second (extended) position of FIG. 15. In another embodiment, the connector beam 302 may be mounted on a rotary bearing with a vertical axis so it rotates horizontally to the second (extended) position of FIG. 15.

In this embodiment, the connector beam 302 is driven by a rotary tool 306. In another embodiment, the connector beam 302 may be driven to the second (extended) position by a pre-loaded spring which is released after the panel 40 has been installed.

In this embodiment, the connector beam 302 is driven to the second (extended) position by a rack-and-pinion mechanism. In another embodiment, the connector beam 302 may be slid to the second (extended) position by providing a handle which extends down from the connector beam 302 through a slot in the panel 40, manually gripping the handle, and pushing the handle along the slot so that the connector beam 302 slides on its bearings.

In the embodiments of FIGS. 10-15, the biasing arrangement comprises a spring 201 coupled to the link 150, 350, and the spring 201 holds the link in its upright orientation by applying a biasing force to the link. The upright orientation may or may not be a strictly vertical orientation.

In alternative embodiments, other biasing arrangements may be used. For instance, the grow-out 202 may carry a counter-weight which biases the biases the link 150, 350 towards its upright orientation.

Figure 16:
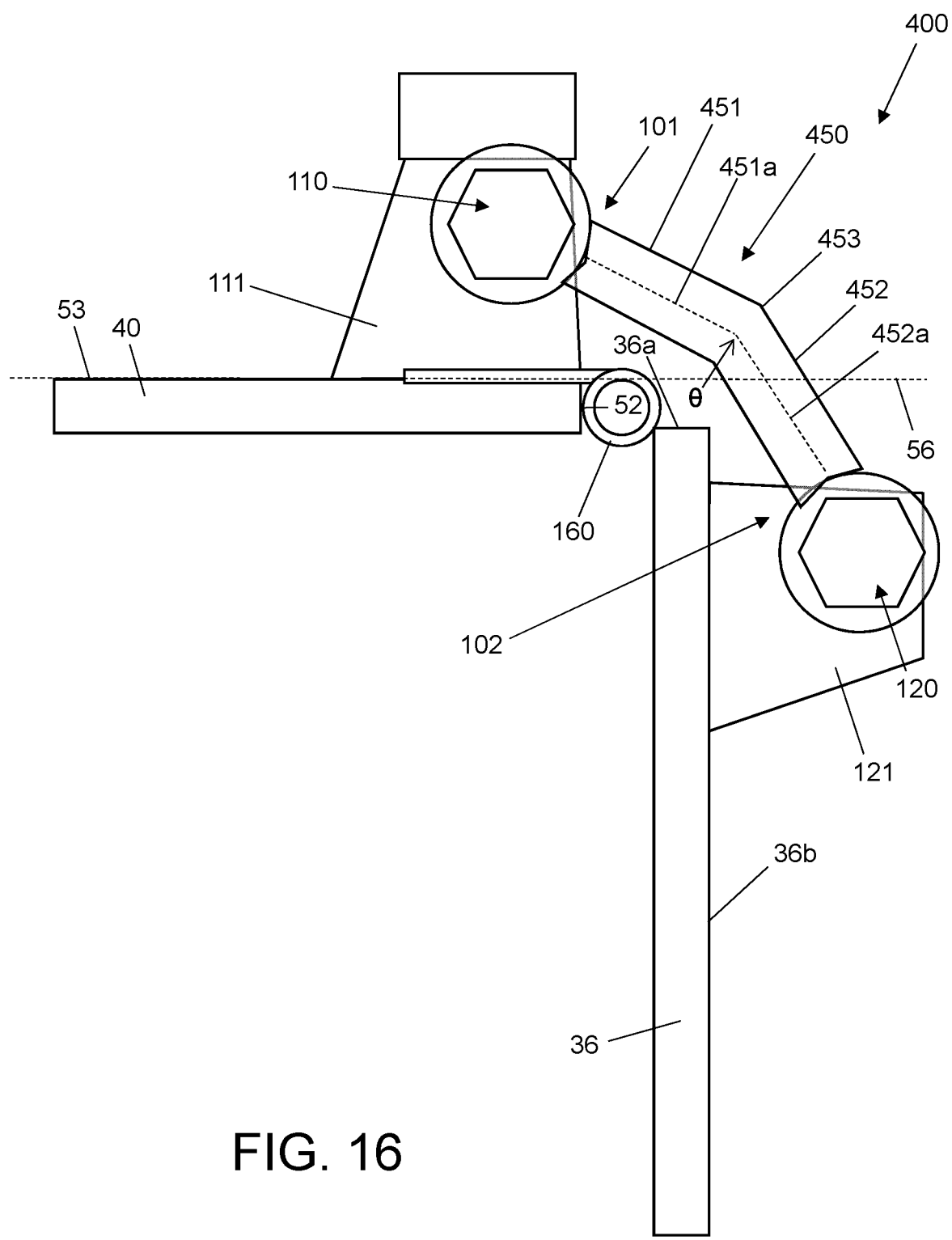
FIG. 16 shows a panel support arrangement according to a fourth embodiment of the disclosure herein.

FIG. 16 show a panel support arrangement 400 according to a fourth embodiment of the disclosure herein. Most elements of the panel support arrangement 400 are identical to the panel support arrangement 100 in the first embodiment of FIGS. 8 and 9, so only the differences will be described.

The straight link 150 of the first embodiment is replaced by a kinked link 450 comprising a first arm 451, a second arm 452, and a corner 453 where the first and second arms meet at an obtuse angle θ. The kinked link may be made from aluminum, or any other suitable material.

The first arm 451 of the kinked link is pivotally attached to the trailing edge panel at the first pivot joint 110, and the second arm 452 of the kinked link is pivotally attached to the fairing at the second pivot joint 120.

The first arm 451 of the kinked link crosses above the inboard edge 52 of the trailing edge panel.

The first arm 451 of the kinked link has a substantially straight center line 451a which extends downwardly to the corner 453; and the second arm 452 of the kinked link has a substantially straight center line 452a which extends downwardly from the corner 453.

The kinked link 450 provides a compact and low-profile design which can connect the brackets 111, 121 around the corner as shown in FIG. 16. The kinked link 450 is preferable to a link which follows a continuous circular curve, because it is more statically determinate.

Figure 17:
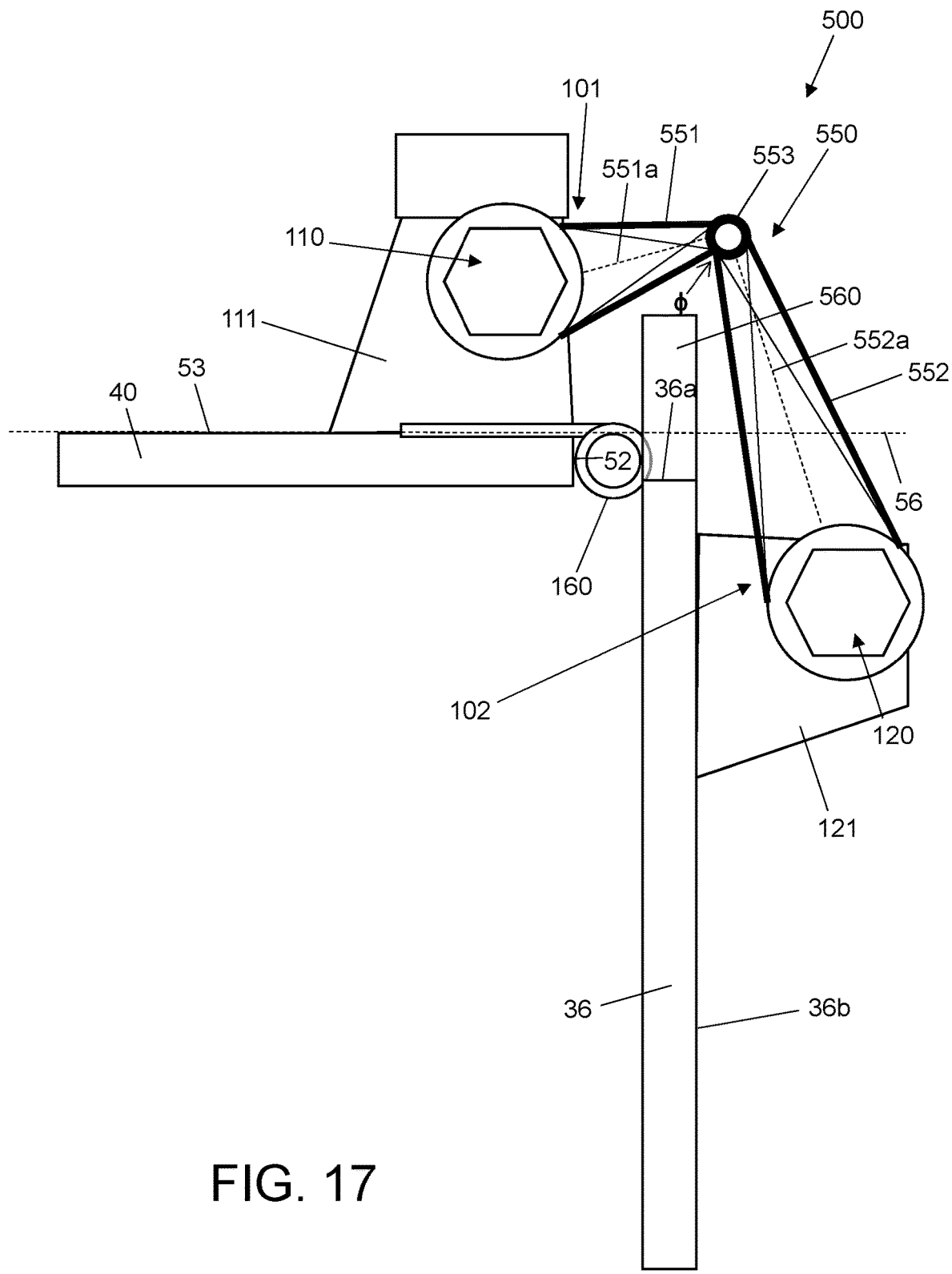
FIG. 17 shows a panel support arrangement according to a fifth embodiment of the disclosure herein.

FIG. 17 show a panel support arrangement 500 according to a fifth embodiment of the disclosure herein. Most elements of the panel support arrangement 500 are identical to the panel support arrangement 400 of FIG. 16, so only the differences will be described.

The kinked link 450 of FIG. 16 is replaced by a kinked link 550 comprising a first arm 551, a second arm 552, and a corner 553 where the first and second arms meet at an acute angle $\phi$. The first arm 551 of the kinked link is pivotally attached to the trailing edge panel at the first pivot joint 110, and the second arm 552 of the kinked link is pivotally attached to the fairing at the second pivot joint 120.

The first arm 551 of the kinked link crosses above the inboard edge 52 of the trailing edge panel.

The first arm 551 of the kinked link has a substantially straight center line 551a which extends upwardly to the corner 553; and the second arm 552 of the kinked link has a substantially straight center line 552a which extends downwardly from the corner 553.

The kinked link 550 provides a less compact design than the kinked link 450. This is out of necessity in order to avoid clashing with an obstruction 560 at the upper edge of the fairing.

The obtuse angle $\theta$ of FIG. 16 is preferred to the acute angle $\phi$ of FIG. 17, because a smaller angle increases the required material properties of the link. Alternatively, the first and second arms may meet at a right angle.

While the straight links 150, 350 may be plain machined aluminum billet, the kinked links 450, 550 may have to utilize more exotic materials such as steel or titanium, and be made from processes such as additive layer manufacturing. The kinked links 450, 550 may also require the use of topology optimization to create an optimized design, best utilizing the high strength material as shown in the kinked link 550 of FIG. 17. The kinked link 450 of FIG. 16 may be solid, whereas the kinked link of FIG. 17 may have a more structurally optimized design formed by a series of struts.

The following alternatives and statements of advantage relate to some or all of the embodiments described above.

Instead of providing a dedicated support structure, such as a fixed trailing edge rib, to support the inboard or outboard edge of the trailing edge panel, the embodiments above use an existing aerodynamic structure (the fairing 32) to support the trailing edge panel via a panel support arrangement 100, 200 etc. The absence of a dedicated support structure reduces weight, and minimizes the space taken up in the trailing edge.

The panel support arrangements 100, 200 etc. described above enable the routings 70 to be installed or removed as a modular unit by moving the routings 70 in the fore-aft direction (transverse to their length) rather than by threading the routings 70 in a spanwise direction (along their length). The routings 70 can be installed or removed in the fore-aft direction (transverse to their length) without clashing with the panel support arrangements 100, 200 etc. This can be contrasted with the mid-span support links 60 which must not be present during installation or removal of the routings 70.

Thus, the routings 70 may be installed or removed by moving them transverse to their length (i.e. in the fore-aft direction) past the link 150, 350, 450, 550 and past the panel support arrangement 100, 200 etc. The low profile of the panel support arrangement ensures that it does not clash with the routings 70 as they are installed or removed.

The fairing 32 is attached to the lower cover 8, preferably by one or more tension joints 34. Alternatively, the fairing 32 may be attached to another part of the wingbox, such as the rear spar.

In the embodiments above, the second end of the link is pivotally attached to a flap-track fairing 32 at the second pivot joint. In other embodiments of the disclosure herein, the second end of the link may be pivotally attached to another support structure, such as another type of fairing, or a spoiler support bracket. The support structure may be attached to the rear spar, to the upper or lower cover, or to another part of the wingbox.

In the detailed examples given above, the support structure (fairing 32) is positioned inboard of the inboard edge 52 of the trailing edge panel 40, and the link is pivotally attached to the inboard face of the support structure (the inner face 36b of the fairing 32). The outboard edge of the lower trailing edge panel 41 is attached to the fairing 32 by a similar panel support arrangement. In this case, the support structure (fairing 32) is positioned outboard of the outboard edge of the trailing edge panel 41, and the link is pivotally attached to the outboard face of the support structure.

The embodiments above disclose various panel support arrangements for supporting a lower trailing edge panel 40. In other embodiments of the disclosure herein, similar support arrangements may be used to support an upper trailing edge panel.

The second pivot joint may be lower than the first pivot joint. This arrangement results in a low profile link, minimizing the space taken up in the trailing edge by the link and reducing the risk of clash with the routings 70 as the routings 70 are installed or removed.

The first pivot joint and the second pivot joint may be located on first and second sides of the plane 56 of the trailing edge panel. This arrangement results in a low profile link, minimizing the space taken up in the trailing edge by the link and reducing the risk of clash with the routings 70 as the routings 70 are installed or removed.

The first pivot joint may comprise a first bracket 111 which protrudes from the lower trailing edge panel. The use of such a protruding bracket 111 enables the link to be positioned as required.

The second pivot joint may comprise a second bracket 121 which protrudes from the fairing or other support structure. The use of such a protruding bracket 121 enables the link to be positioned as required.

The link may have a center line which extends downwardly along its full length from the first end of the link to the second end of the link. This arrangement results in a low profile link, minimizing the space taken up in the trailing edge by the link and reducing the risk of clash with the routings 70 as the routings 70 are installed or removed.

In the embodiments above, the first pivot joint is configured to permit rotation about a first pivot axis 112, and the second pivot joint is configured to permit rotation about a second pivot axis 122 which is preferably substantially parallel with the first pivot axis. The first and second pivot axes 112, 122 may extend in a fore-aft direction. Orienting the pivot axes 112, 122 in the fore-aft (or chordwise direction) enables the panel to deflect easily in the spanwise direction.

A center line of the link may extend in a plane which is parallel with the plane of the spar web, and/or in a vertical spanwise plane. This can be contrasted with the mid-span support link 60, or the lower strut in US2013/0146712, which extend in a vertical chordwise plane and hence may occupy valuable space within the trailing edge.

The link may cross above or below the inboard edge 52 or outboard edge of the trailing edge panel. This enables the link to be positioned close to the inboard or outboard edge of the trailing edge panel.

The second pivot joint may be horizontally offset from the first pivot joint. This enables the panel to deflect easily, particularly in a vertical direction.

The second pivot joint may be horizontally offset from the first pivot joint in the spanwise direction. This makes the link less likely to obstruct the routings 70 within the trailing edge.

The first end of the link may be pivotally attached to the upper surface 53 of the lower trailing edge panel; and the second end of the link may be pivotally attached to the inner surface 36b of the fairing. This ensures that the link is not exposed to airflow during flight of the aircraft.

The first end of the link may be pivotally attached to the lower trailing edge panel adjacent to one of the spanwise edges of the trailing edge panel. This enables the link to support the spanwise edge of the trailing edge panel, preventing flutter.

The leading edge 50 of the panel 40 may be secured to the wingbox via the anchor nut rail 55 before the panel support arrangements 100, 200 etc. are installed to secure the inboard and outboard ends of the panel. However, this is not essential, and in other embodiments the order may be reversed: i.e. the panel support arrangements 100, 200 etc. may be installed before the leading edge 50 of the panel 40 is secured to the wingbox.

In the embodiments above the wingbox has a rear spar 9 and a forward spar 13. In other embodiments the wingbox may have more than two spars, or only a rear spar.

A straight line joining the first pivot joint to the second pivot joint may be angled down by more than 45 degrees relative to the horizontal.

A resilient seal member may seal a gap between the fairing and the lower trailing edge panel.

Where the word 'or' appears this is to be construed to mean 'and/or' such that items referred to are not necessarily mutually exclusive and may be used in any appropriate combination.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft wing comprising:
a wingbox with an upper cover, a lower cover, and a rear spar;
a lower trailing edge panel with a leading edge, wherein the lower trailing edge panel is rigidly attached, at the leading edge thereof, to the lower cover of the wingbox;
a flap;
a flap deployment mechanism which is configured to deploy the flap;
a fairing which covers the flap deployment mechanism; and
a panel support arrangement which attaches the lower trailing edge panel to the fairing, such that at least a portion of the fairing extends vertically below the lower trailing edge panel;
wherein the panel support arrangement comprises a link which extends from a first end of the link to a second end of the link;
wherein the first end of the link is pivotally attached to the lower trailing edge panel at a first pivot joint;
wherein the second end of the link is pivotally attached to the fairing at a second pivot joint; and
wherein the second pivot joint is lower than the first pivot joint.

2. The aircraft wing according to claim 1, comprising:
a spoiler; and
a spoiler stop protruding from an upper surface of the lower trailing edge panel;
wherein the spoiler stop is configured to be contacted by the spoiler in an event of an over-travel failure of the spoiler.

3. An aircraft wing comprising:
a wingbox with an upper cover, a lower cover, and a rear spar;
a lower trailing edge panel with a leading edge, wherein the leading edge of the lower trailing edge panel is attached to the wingbox;
a flap;
a flap deployment mechanism configured to deploy the flap;
a fairing which covers the flap deployment mechanism; and
a link which extends from a first end of the link to a second end of the link;
wherein the first end of the link is pivotally attached to the lower trailing edge panel at a first pivot joint;
wherein the second end of the link is pivotally attached to the fairing at a second pivot joint; and
wherein the second pivot joint is lower than the first pivot joint.

4. The aircraft wing according to claim 3, wherein:
the lower trailing edge panel defines a plane;
the first pivot joint is located above the plane of the lower trailing edge panel; and
the second pivot joint is located below the plane of the lower trailing edge panel.

5. The aircraft wing according to claim 3, wherein the second pivot joint is horizontally offset from the first pivot joint.

6. The aircraft wing according to claim 5, wherein:
the leading edge of the lower trailing edge panel extends in a spanwise direction; and
the second pivot joint is horizontally offset from the first pivot joint in the spanwise direction.

7. The aircraft wing according to claim 3, wherein:
the rear spar comprises a spar web; and
a center line of the link lies in a plane which is parallel with a plane of the spar web.

8. The aircraft wing according to claim 3, wherein the link has a center line which extends downwardly along its full length from the first end of the link to the second end of the link.

9. The aircraft wing according to claim 8, wherein the center line is substantially straight along its full length from the first end of the link to the second end of the link.

10. The aircraft wing according to claim 3, wherein:
the link has a center line; and
at least part of the center line is offset from a straight line joining the first pivot joint to the second pivot joint.

11. The aircraft wing according to claim 3, wherein the link has a substantially straight center line which is parallel with, and offset from, a straight line joining the first pivot joint to the second pivot joint.

12. The aircraft wing according to claim 11, wherein the substantially straight center line is parallel with, and offset from, the straight line joining the first pivot joint to the second pivot joint along a full length of the straight line, from the first end of the link to the second end of the link.

13. The aircraft wing according to claim 3, wherein:
the lower trailing edge panel has a trailing edge, which is opposite the leading edge, and a pair of opposite spanwise edges;
the fairing has an upper edge; and
a resilient seal member seals a gap between the upper edge of the fairing and one of the spanwise edges of the lower trailing edge panel.

14. The aircraft wing according to claim 3, wherein:
the first pivot joint is configured to permit rotation about a first pivot axis; and
the second pivot joint is configured to permit rotation about a second pivot axis, which is substantially parallel with the first pivot axis.

15. The aircraft wing according to claim 3, wherein:
the lower trailing edge panel has an upper surface and a lower surface, which is configured to be exposed to airflow during flight of the aircraft wing;
the fairing has an inner surface, which faces towards the flap deployment mechanism, and an outer surface, which faces away from the flap deployment mechanism and is configured to be exposed to airflow during flight of the aircraft wing;
the first end of the link is pivotally attached to the upper surface of the lower trailing edge panel; and
the second end of the link is pivotally attached to the inner surface of the fairing.

16. The aircraft wing according to claim 3, wherein:
the lower trailing edge panel has a trailing edge, which is opposite the leading edge, and a pair of opposite spanwise edges; and
the first end of the link is pivotally attached to the lower trailing edge panel adjacent to one of the spanwise edges of the lower trailing edge panel.

17. The aircraft wing according to claim 3, comprising routings which run along the aircraft wing, behind the rear spar, in a spanwise direction.

18. A method of assembling or disassembling the aircraft wing of claim 17, the method comprising installing or removing the routings by moving the routings transverse to a length of the routings past the link or past a panel support arrangement.

19. An aircraft wing comprising:
a wingbox with an upper cover, a lower cover, and a rear spar;
a lower trailing edge panel with a leading edge, wherein the lower trailing edge panel is rigidly attached, at the leading edge thereof, to the lower cover of the wingbox;
a flap;
a flap deployment mechanism which is configured to deploy the flap;
a fairing which covers the flap deployment mechanism;
a panel support arrangement which attaches the lower trailing edge panel to the fairing, such that at least a portion of the fairing extends vertically below the lower trailing edge panel;
a spoiler; and
a spoiler stop protruding from an upper surface of the lower trailing edge panel;
wherein the spoiler stop is configured to be contacted by the spoiler in an event of an over-travel failure of the spoiler.

* * * * *